(12) United States Patent
Harada et al.

(10) Patent No.: US 8,796,363 B2
(45) Date of Patent: Aug. 5, 2014

(54) FLAME RETARDANT RESIN COMPOSITION AND MOLDED PRODUCT

(75) Inventors: Tadakatsu Harada, Kanagawa (JP);
Yasuo Yamanaka, Tokyo (JP);
Yasuyuki Matsushita, Aichi (JP);
Kazuhiko Fukushima, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/983,697

(22) PCT Filed: Feb. 24, 2012

(86) PCT No.: PCT/JP2012/055288
§ 371 (c)(1),
(2), (4) Date: Aug. 5, 2013

(87) PCT Pub. No.: WO2012/118165
PCT Pub. Date: Sep. 7, 2012

(65) Prior Publication Data
US 2013/0317138 A1    Nov. 28, 2013

(30) Foreign Application Priority Data

Mar. 1, 2011 (JP) ................................. 2011-043787
Mar. 1, 2011 (JP) ................................. 2011-043788
Oct. 13, 2011 (JP) ................................. 2011-225820

(51) Int. Cl.
*C08L 67/04* (2006.01)
(52) U.S. Cl.
USPC ........................................................ 524/73
(58) Field of Classification Search
CPC ....... C08L 67/04; C08L 97/005; C08L 69/00; C08L 55/05
USPC ....................................................... 524/72, 73
See application file for complete search history.

(56) References Cited

U.S. PATENT DOCUMENTS

| 4,925,923 A * | 5/1990 | Yalpani et al. ................. 530/506 |
| 2005/0119411 A1 | 6/2005 | Terada et al. |
| 2009/0162683 A1 * | 6/2009 | Douard ......................... 428/480 |

FOREIGN PATENT DOCUMENTS

| EP | 1273632 A1 | 1/2003 |
| JP | 2001-342353 | 12/2001 |
| JP | 2002-355579 | 2/2002 |
| JP | 2004-256809 | 9/2004 |
| JP | 2005-023260 | 1/2005 |
| JP | 2005-162872 | 6/2005 |
| JP | 2010-031229 | 2/2010 |
| JP | 2010-031230 | 2/2010 |
| JP | 2010-116465 | 5/2010 |
| WO | WO03/082987 | 10/2003 |

OTHER PUBLICATIONS

International Search Report Issued for counterpart International Patent Application No. PCT/JP2012/055288 dated May 29, 2012,.
Miyagawa, et al., Conversion of lignin into functional substances—fabrication of fire retardant materials-, Abstracts of the 61st Annual Meeting of Japan Wood Research Society, Apr. 4, 2011 (date of receipt), vol, 61st, PageROMBUNNO. Z18-01-1530.

* cited by examiner

*Primary Examiner* — John Uselding
(74) *Attorney, Agent, or Firm* — Cooper & Dunham LLP

(57) ABSTRACT

A flame retardant resin composition including: a thermoplastic resin; and a flame retardant, wherein the flame retardant includes a phosphorylated lignin derivative, and wherein the phosphorylated lignin derivative is produced by adding phosphoric acid to a lignin derivative obtained by subjecting a naturally occurring lignin to a predetermined treatment.

7 Claims, No Drawings

FLAME RETARDANT RESIN COMPOSITION AND MOLDED PRODUCT

TECHNICAL FIELD

The present invention relates to a flame retardant resin composition and a molded product that have excellent flame retardancy and are usable in components for image output equipment such as copying machines and printers and electric/electronic equipment such as home electric appliances.

BACKGROUND ART

A number of resin components are utilized, for example, for image output equipment such as copying machines and printers, electric/electronic equipment such as home electric appliances and interior components in automobiles. For these resin components, flame retardancy is required of resin materials for fire spreading prevention purposes.

In particular, copying machines have in their interior a fixation unit that becomes an elevated temperature state, and resin materials are also used at portions around the fixation unit. Further, copying machines are provided with a unit for the generation of a high voltage such as an electrification unit and a 100-V alternating current power supply unit. These units have a maximum power consumption of several hundreds of watts to 500 watts and are constituted by units utilizing a power system of 100 V and 15 A.

Such copying machines, mainly multi-function copying machines typified by multi-function printers, are stationary electric/electronic equipment, and, in international standards regarding flame retardancy of resin materials (IEC60950) that are one of safety standards for product equipment, ignition sources or portions in danger of ignition are required to be covered by an enclosure component having a flame retardancy level of "5V" as specified in UL94 standards (Underwriters Laboratories Inc., standard). The testing method for "5V" in UL94 standards is defined as "A flame test by a 500-W testing flame" in international standards IEC60695-11-20 (ASTM D 5048).

For components for the construction of a copying machine body, interior components within the enclosure in addition to components for the enclosure are required to meet "V-2" or higher level in UL94 standards. The testing method for the "V-2" or higher level in UL94 standards is defined as "A 20-mm vertical flame test" in international standards IEC60695-11-10, method B (ASTM D 3801).

Flame retardants that can be added to the resin material are divided into several types, and those commonly used herein are bromine flame retardants, phosphorus flame retardants, nitrogen compound flame retardants, silicone flame retardants, and inorganic flame retardants. Flame retarding mechanisms of these flame retardants are already known in several documents, and three flame retarding mechanisms that are adopted particularly frequently will be described here.

The first flame retarding mechanism is one using halogen compounds typified by nitrogen flame retardants. For example, halogen compounds are allowed to act as a negative catalyst in an oxidation reaction on a combustion flame to lower a combustion speed.

The second flame retarding mechanism is one using phosphorus flame retardants or silicone flame retardants. Bleeding of silicone flame retardants on the surface of the resin during combustion or a dehydration reaction of phosphorus flame retardants within the resin results in the production of a carbide (char) on the surface of the resin to form a heat insulating film that stops burning.

The third flame retarding mechanism is one using inorganic flame retardants such as magnesium hydroxide or aluminum hydroxide.

The combustion is stopped, for example, by cooling the whole resin through the utilization of an endothermic reaction that takes place upon the decomposition of these compounds by the combustion of the resin, or an evaporative latent heat possessed by the produced water.

On the other hand, conventional resin materials are made of plastic materials using petroleum as a starting material. In recent years, however, attention has been drawn to biomass derived resins using, for example, plants as a starting material. The biomass resource means that organisms such as plants or animals are used as a resource. Examples of biomass resources include woods, corns, fats and oils obtained from soybeans or animals, and raw refuses. Biomass-derived resins are produced using these biomass resources as starting materials. Biodegradable resins are also generally known. Biodegradation refers to a function of being degraded by, for example, microorganisms under certain environments in terms of temperature and humidity.

Some biodegradable resins are resins that are not biomass-derived resins but petroleum-derived resins and are biodegradable.

Biomass-derived resins include poly lactic acid (PLA) produced by chemical polymerization using, as a monomer, lactic acid produced by fermenting saccharides such as potatoes, sugar canes, and corns, esterified starches composed mainly of starch, in microorganism-producing resins (poly hydroxy alkanoate) that are polyesters, which microorganisms produce in their bodies, and PTT (poly trimethylene terephtalate) produced by a fermentation method using, as starting materials, 1,3-propanediol and petroleum-derived terephthalic acid.

At the present time, petroleum-derived starting materials are used. However, studies are advanced aiming at the transfer of resins produced using petroleum-derived starting materials adopted at the present time to biomass-derived resins in the future. For example, succinic acid that is one of main starting materials for PBS (poly butylene succinate) is produced using a plant-derived starting material. Among such biomass-derived resins, products produced by applying poly lactic acid that has a high melting point around 180° C., possesses excellent moldability, and can be stably supplied to the market are becoming realized.

The poly lactic acid, however, has a low glass transition point of 56° C. and, for this reason, has a low thermal deformation temperature around 55° C., indicating that the poly lactic acid has low heat resistance. In addition, since the poly lactic acid is a crystalline resin, the impact resistance is also low and is 1 kJ/m$^2$ to 2 kJ/m$^2$ in terms of Izod impact strength, making it difficult to adopt the poly lactic acid in durable members such as electric/electronic equipment products.

In order to overcome the above drawbacks, an attempt has been made to improve physical properties, for example, by adopting a polymer alloy of the biomass-derived resin with a polycarbonate resin that is a petroleum resin. According to this technique, however, the content of the petroleum resin is high and the content of the biomass-derived resin is around 50%, and, consequently, the effect of reducing the amount of fossils used and reducing the amount of carbon dioxide emissions for environmental load reduction purposes such as global warming countermeasure is disadvantageously reduced by half.

For example, PTL 1 proposes an electric/electronic component produced by molding a resin composition containing 1 part by mass to 350 parts by mass, based on 100 parts by mass of a plant-derived resin, of a naturally occurring organic filler, the plant-derived resin being a poly lactic acid resin, the naturally occurring organic filler being at least one filler selected from paper powder and wood powder, 50% by mass or more of the paper powder being accounted for by a used paper powder. The claimed advantage of this proposal is to improve the mechanical strength of the resin by the addition of naturally occurring organic fillers such as paper powder to poly lactic acid. For flame retardancy purposes, however, 23 parts by mass to 29 parts by mass, based on 100 parts by mass of poly lactic acid, of fossil-derived flame retardants such as phosphorus flame retardants should be added. Even when the resin material is changed to biomass materials as a base for environment load reduction purposes, the use of the large amount of fossil-derived flame retardants spoils the effect attained by the use of the biomass materials.

PTL 2 proposes a resin composition containing at least one biodegradable organic polymeric compound, a flame retardant additive containing a phosphorus-containing compound, and at least one hydrolysis inhibitor that inhibits the hydrolysis of the organic polymeric compound. According to this proposal, in order to flame-retard the biodegradable organic polymeric compound such as poly lactic acid, 30 parts by mass to 60 parts by mass, based on 140 parts by mass of the organic polymeric compound, of the flame retardant additive containing the phosphorus-containing compound should be added. Since the flame retardant additive containing the phosphorus-containing compound uses a fossil resource as the starting material, the proportion of biomass is disadvantageously lowered.

Regarding a technique for flame-retarding resin materials using biomass as a starting material, in order to overcome a problem of a high environment load involved in conventional flame retardant materials using petroleum materials, PTL 3 proposes a process for producing an organic-inorganic hybrid flame retardant cellulose material that contains mixing and homogeneously dispersing 0.1 part by mass to 150 parts by mass of an alkoxysilane compound (B) into 100 parts by mass of acetylcellulose (A), then eliminating the acetyl group partially or completely and hydrolyzing and condensing the alkoxysilane compound. According to the proposed method, the acetylcellulose and the alkoxysilane compound are merely kneaded with each other to obtain the organic-inorganic hybrid flame retardant cellulose material. The results of a test of the organic-inorganic hybrid flame retardant cellulose material by a method according to UL94 combustion test show that the combustion time of specimens is increased, but on the other hand, the specimens are completely burned out, indicating that the flame retardancy is unsatisfactory. PTL 3 describes that the material is moldable, but there is no concrete working example on the molding.

In order to accomplish a task of a flame retardant material that is free from the evolution of toxic gases such as dioxin, develops flame retardancy and utilizes a biomass material, PTL 4 proposes a polymeric composition containing a polymeric substance and a flame retardant, the flame retardant containing a polymer having on its side chain a flame retardant compound. Specifically, the flame retardant is a polymer that has on its side chain a heterocyclic compound containing nitrogen as a hetero atom and uses an organism-derived substance such as a nucleic acid base in a part of monomers for the polymer.

The flame retardant material in this proposal contains a polymeric material having on its side chain a flame retardant heterocyclic compound using a hetero atom but is disadvantageous in that the polymeric material as a starting material is not a biomass material and cannot provide a low environment load due to the addition of a large amount. In this conventional technique, the thermoplastic resin is kneaded with the flame retardant. According to this method, the flame retardancy is developed. When molding of the composition for use as a lo molded product is taken into consideration, due to a lowering in affinity between the thermoplastic resin and the flame retardant, disadvantageously, the fluidity of the resin is deteriorated leading to deteriorated moldability and sometimes leading to lowered physical properties.

In order to accomplish a task that simultaneous realization of physical properties such as strength and flame retardancy increases the dependency on petroleum products, PTL 5 proposes a flame retardant polyester resin composition containing 50% by mass to 80% by mass of a naturally occurring biodegradable polyester resin (A) and 50% by mass to 20% by mass of a thermoplastic polyester resin (B) produced by copolymerizing an organophosphorus compound. Specifically, polyethylene terephthalate (PET) or polybutylene succinate (PBS) copolymerized with an organic phosphorus is blended with poly lactic acid.

According to this proposal, however, polyethylene terephthalate produced using a petroleum-derived starting material, and, further, at the present time, succinic acid and butanediol as starting materials for polybutylene succinate are also petroleum-derived starting materials. Accordingly, disadvantageously, there is no difference in degree of biomass between this proposed material and the conventional flame retardant. In this conventional technique, an organophosphorus compound is copolymerized in the structure of the thermoplastic polyester resin. This means that an organophosphorus compound is introduced into a main chain of the thermoplastic polyester resin. Further, due to a feature of the development of flame retardancy by the organophosphorus compound, the flame retardancy is developed by the elimination of phosphorus. Since, however, phosphorus is introduced into the main chain, the elimination is less likely to occur. Even though the elimination successfully occurs, the main chain is cut off, the molecular weight is lowered. Consequently, dripping is likely to occur, and it becomes difficult to ensure flame retardancy. Accordingly, for transfer to lower dependency on petroleum, even when the biomass-derived thermoplastic polyester resin in which the organophosphorus compound is copolymerized is used, the task of simultaneously meeting both the physical properties and the flame retardancy cannot be accomplished.

PTL 6 proposes a flame retardant resin composition containing at least a thermoplastic resin and a flame retardant, the flame retardant being a phosphorus-containing polysaccharide containing a naturally occurring polysaccharide having a phosphoric ester on a side chain thereof. PTL 7 proposes a flame retardant resin composition containing at least a thermoplastic resin and a flame retardant, the flame retardant being a phosphorus-containing polysaccharide containing a naturally occurring polysaccharide having a thiophosphoric ester on a side chain thereof.

Accordingly, any flame retardant resin composition having satisfactory properties that has a low petroleum dependency, a high degree of biomass, a low environment load, and, at the same time, flame to retardancy has not been obtained yet, and, thus, further improvement and development have been demanded in the art.

CITATION LIST

Patent Literature

PTL 1: Japanese Patent Application Laid-Open (JP-A) No. 2005-23260

PTL 2: JP-A No. 2005-162872
PTL 3: JP-A No. 2002-356579
PTL 4: International Publication No. WO20031082987
PTL 5: JP-A No. 2004-256809
PTL 6: JP-A No. 2010-31230
PTL 7: JP-A No. 2010-31229

SUMMARY OF INVENTION

Technical Problem

An object of the present invention is to provide a flame retardant resin composition that has a low petroleum dependency, a high degree of biomass, a low environment load, and, at the same time, flame retardancy, and to provide a molded product.

Solution to Problem

The above problems can be solved by the following means. A flame retardant resin composition according to the present invention includes: a thermoplastic resin; and a flame retardant, wherein the flame retardant includes a phosphorylated lignin derivative, and wherein the phosphorylated lignin derivative is produced by adding phosphoric acid to a lignin derivative obtained by subjecting a naturally occurring lignin to a predetermined treatment.

According to the flame retardant resin composition, a low-environment load-type flame retardant resin material can be obtained that has flame retardancy and a high degree of biomass. Further, a high level of dispersibility in resin can be obtained through the action of a hydrophilic group possessed by lignin derivatives. Furthermore, the lignin derivative has binding properties due to the nature of a polymeric substance, can realize a stable dispersion state in resin and, thus, can suppress bleedout in use.

Advantageous Effects of Invention

The present invention can provide a flame retardant resin composition that can simultaneously realize a low petroleum dependency, a high degree of biomass, a low environment load, and flame retardancy, and a molded product.

DESCRIPTION OF EMBODIMENTS (Flame Retardant Resin Composition)

The flame retardant resin composition according to a first embodiment of the present invention includes; a thermoplastic resin; a so flame retardant, wherein the flame retardant includes a phosphorylated lignin derivative and wherein the phosphorylated lignin derivative is produced by adding phosphoric acid to a lignin derivative obtained by subjecting a naturally occurring lignin to a predetermined treatment. If necessary, the flame retardant resin composition includes other ingredients.

According to the flame retardant resin composition of the present invention, a flame retardant resin material that has flame retardancy, a high degree of biomass and a low environment load can be obtained. Further, a high level of dispersibility in resin can be obtained through the action of a hydrophilic group possessed by lignin derivatives. Furthermore, the lignin derivative has binding properties due to the nature of a polymeric substance, can realize a stable dispersion state in resin and, thus, can suppress bleedout in use.

The flame retardant resin composition according to a second embodiment of the present invention includes: a thermoplastic resin; a flame retardant, wherein the flame retardant includes a phosphorylated lignin derivative and wherein the phosphorylated lignin derivative is produced by 1) hydroxymethylating a lignin derivative obtained by subjecting a naturally occurring lignin to a predetermined treatment, and then 2) adding phosphoric acid to the hydroxymethylated lignin derivative. If necessary, the flame retardant resin composition includes other ingredients.

According to the flame retardant resin composition of the present invention, a flame retardant resin material that has flame retardancy, a high degree of biomass and a low environment load can be obtained. Further, a high level of dispersibility in resin can be obtained through the action of a hydrophilic group possessed by lignin derivatives. Furthermore, the lignin derivative has binding properties due to the nature of a polymeric substance, can realize a stable dispersion state in resin and, thus, can suppress bleedout in use.

<Flame Retardant>

The flame retardant includes a phosphorylated lignin derivative produced by adding phosphoric acid to a lignin derivative obtained by subjecting a naturally occurring lignin to a predetermined treatment.

The flame retardant includes a phosphorylated lignin derivative produced by 1) hydroxymethylating a lignin derivative obtained by subjecting a naturally occurring lignin to a predetermined treatment, and then 2) adding phosphoric acid to the hydroxymethylated lignin derivative.

When the lignin derivative is a kraft lignin, flame retardancy can be obtained even by using inexpensive starting materials. Further, a kraft lignin (a black liquor) used in cascade as a fuel can be used as a highly functional material, contributing to a lowered environment load.

The use of a phenolated sulfuric acid lignin as the lignin derivative can realize the utilization of a saccharified residual lignin which has not been utilized as a resource, making it possible to obtain flame retarding properties using inexpensive starting materials.

The use of a hydrothermally treated sulfuric acid lignin as the lignin derivative can realize the utilization of a saccharified residual lignin which has not been utilized as a resource, making it possible to obtain flame retarding properties using inexpensive starting materials.

The use of an alkali lignin as the lignin derivative can realize the utilization of a saccharified residual lignin which has not been utilized as a resource, making it possible to obtain flame retarding properties using inexpensive starting materials.

<Thermoplastic Resin>

The thermoplastic resin includes at least one polymer selected from the group consisting of aromatic polyesters, aliphatic polyesters, and polymers containing a carbonate bond.

Biomass may be used as at least a part of the starting material of the thermoplastic resin.

Examples of aromatic polyesters usable herein include polyethylene terephthalate (PET), polybutylene succinate (PBS), polytrimethylene terephthalate (PTT), aromatic polycarbonate resins, liquid crystalline polymers (LCP), and non-crystalline polyallylates.

The aromatic polycarbonate resin may be properly synthesized products or alternatively may be commercially available products. Examples of such commercially available products include Panlite (tradename) manufactured by Teijin Ltd. and Iupilon (tradename) manufactured by Mitsubishi Engineering-Plastics Corporation.

Examples of such aliphatic polyesters include poly lactic acids (PLAs), microorganism-producing polyhydroxy alkanoates (PHAs), polybutylene succinates (PBSs), and aliphatic polycarbonate resins.

Examples of such aliphatic polycarbonate resins include polypropylene carbonates, polyethylene carbonates, and alicyclic polycarbonates having a cyclic structure.

The aliphatic polyester may be properly synthesized products or alternatively may be commercially available products.

The above resin materials may be blended with other resin as long as the effect of the present invention is not sacrificed.

<Flame Retarding Auxiliary>

The flame retardant resin composition according to the present invention may further include a flame retarding auxiliary.

The flame retarding auxiliary is not particularly limited and may be properly selected according to contemplated purposes, and examples thereof include phosphorus flame retardants, nitrogen compound flame retardants, silicone flame retardants, bromine flame retardants, inorganic flame retardants, and polyfluoroolefins.

—Phosphorus Flame Retardant—

The phosphorus flame retardant is not particularly limited and may be properly selected according to contemplated purposes, and, for example, commercially available phosphorus flame retardants may be used. Examples of such phosphorus flame retardants include triphenyl phosphate, cresyl diphenyl phosphate, tricresyl phosphate, trixylenyl phosphate, tris(t-butylated phenyl) phosphate, tris(i-propylated phenyl) to phosphate, 2-ethylhexyldiphenyl phosphate, 1,3-phenylenebis(diphenyl phosphate), 1,3-phenylenebis(dixylenyl) phosphate, bisphenol A (diphenyl phosphate), tris(dichloropropyl) phosphate, tris($\beta$-chloropropyl) phosphate, tris(chloroethyl) phosphate, 2,2-bis(chloromethyl)trimethylenebis (bis(2-chloroethyl) phosphate), polyoxyalkylene bisdichloroalkyl phosphate, and red phosphorus.

—Nitrogen Compound Flame Retardants—

The nitrogen compound flame retardant is not particularly limited and may be properly selected according to contemplated purposes, and examples thereof include melamine phosphate, melamine pyrophosphate, melamine polyphosphate, and ammonium polyphosphate.

—Silicone Flame Retardant—

The silicone flame retardant is not particularly limited and may be properly selected according to contemplated purposes, and examples thereof include silicone resins, silicone rubbers, and silicone oils.

Examples of such silicone resins include resins having a three-dimensional network structure containing a combination of structural units of $SiO_2$, $RSiO_{3/2}$, $R_2SiO$, and $R_3SiO_{1/2}$. In the formulae, R represents an alkyl group such as a methyl, ethyl or propyl group; an aromatic group such as a phenyl or benzyl group; or a substituent containing a vinyl group incorporated in any of the above substituents.

Examples of silicone oils include polydimethylsiloxanes, modified polysiloxanes containing polydimethylsiloxanes having a side chain or an end, at least one methyl group of which has been modified with at least one of a hydrogen atom and alkyl, cyclohexyl, phenyl, benzyl, amino, epoxy, polyether, carboxyl, mercapto, chloroalkyl, alkyl higher alcohol ester, alcohol, aralkyl, vinyl, and trifluoromethyl groups, or mixtures thereof.

—Bromine Flame Retardant—

The bromine flame retardant is not particularly limited and may be properly selected according to contemplated purposes, and, for example, commercially available bromine flame retardants are usable. Examples of such bromine flame retardants include decabromodiphenyl ether, tetrabromobisphenol-A, bis(pentabromophenyl)ethane, 1,2-bis(2,4,6-tribromophenoxy)ethane, 2,4,6-tris(2,4,6-tribromophenoxy)-1,3,5-triazine, 2,6- (or 2,4-) dibromophenol, brominated polystyrene, polybrominated styrene, ethylenebistetrabromo phthalimide, hexabromocyclododecane, hexabromobenzene, pentabromobenzyl acrylate, and pentabromobenzyl acrylate.

—Inorganic Flame Retardant—

The inorganic flame retardant is not particularly limited and may be properly selected according to contemplated purposes, and examples thereof include magnesium hydroxide, aluminum hydroxide, antimony trioxide, and antimony pentoxide.

—Polyfluoroolefin—

The polyfluoroolefin is not particularly limited and may be properly selected according to contemplated purposes, and examples thereof include commercially available polyfluoroolefin. Metabulene Type A (tradename; manufactured by Mitsubishi Rayon Co., Ltd.) may be mentioned as a product obtained by the polyfluoroolefin covered with a methyl methacrylate resin.

For the content of the flame retarding auxiliary, the optimal addition amount may vary depending upon the type of the flame retardant and is not particularly limited and, thus, may be properly selected according to contemplated purposes.

—Other Ingredients—

Other ingredients may be properly selected according to contemplated purposes without particular limitation from conventional additives used in flame retardant resin compositions, and examples thereof include compatibilizers, plasticizer, antioxidants, ultraviolet absorbers, processing aids, antistatic agents, colorants, hydrolysis inhibitors, and crystallization nucleating agents. These other ingredients may be added in such an amount that does not sacrifice the effect of the present invention. One type of these other ingredients may be used, or alternatively, a plurality of other ingredients may be used in combination.

Examples of such hydrolysis inhibitors include carbodiimide-modified isocyanates, organic phyosphite metal salt compounds, tetraisocyanate silane, monomethylisocyanate silane, alkoxysilanes, styrene-2-isopropenyl-2-oxazoline copolymers, and 2,2-m-phenylenebis(2-oxazoline).

Examples of suitable crystallization nucleating agents include talc nucleating agents, nucleating agents containing phenyl-containing metal salt materials, and benzoyl compound-type nucleating agents. Other conventional crystallization nucleating agents, for example, lactic acid salt, benzoic acid salt, silica, phosphoric ester salt-type crystallization nucleating agents are usable without any problem.

The flame retardant resin composition according to the present invention possesses excellent moldability and is suitable for use in various fields. The flame retardant resin composition according to the present invention can be molded into products having various shapes, structures, and sizes and is particularly suitable for use in the production of the molded product according to the present invention which will be described later.

(Molded Product)

The molded product according to the present invention is not particularly limited except that the flame retardant resin composition according to the present invention is molded. The shape, structure and size of the molded product may be properly selected according to contemplated purposes.

Any method used in the molding may be used without particular limitation, and the method may he properly selected among conventional methods according to contemplated purposes. Examples of such methods include film molding, extrusion molding, injection molding, blow molding, compression molding, transfer molding, calender molding, thermoforming, flow molding, and laminate molding. Among them, any method selected from film molding, extrusion molding, and injection molding is preferred when the molded product is used, for example, as image output equipment such as copying machines and printers and electric/electronic equipment such as home electric appliances. Injection molding is particularly preferred.

For example, for molding of casing components such as exterior covers of copying machines, molded products that satisfy appearance and dimension requirements can be obtained by molding with a 350-ton electric injection molding machine using a metal mold, the temperature of which can be regulated with a water temperature regulator under conditions of metal mold temperature 40° C., injection pressure 90 MPa, and injection speed 10 mm/sec.

—Applications—

The molded product according to the present invention has flame retardancy as well and is suitable for use as components usable in image output equipment using electrophotographic techniques, printing techniques, or ink jet techniques for copying machines and laser printers, electric/electronic equipment for home electric appliances, and interior components for automobiles.

EXAMPLES

The present invention will be described with reference to the following Examples. However, it should be noted that the present invention is not limited to these Examples.

The flame retardant resin composition according to the present invention will be described in Examples 1 to 8 and Comparative Examples 1 to 8.

At the outset, Examples 1 to 4 and Comparative Examples 1 to 4 will be described.

Examples 1 and 2

<Preparation of Lignin Derivative>

Two types of lignin derivatives, i.e., kraft lignin and phenolated sulfuric acid lignin, were used as the lignin derivative. The kraft lignin in Example 1 is contained in a cooking liquor (a black liquor) discharged in the production of pulp by a kraft process in which an aqueous sodium hydroxide and an aqueous sodium sulfide solution are brought into a cooking liquor). In Example 1, Lignin, alkali (370959), a reagent manufactured by Aldrich, was used.

Phenolated sulfuric acid lignin in Example 2 was one obtained by saccharifying wood as a starting material with sulfuric acid to give a residual lignin (sulfuric acid lignin) and reacting the residual lignin with phenol to enhance reaction activity.

Lignin derivatives other than mentioned above usable herein include hydrothermally treated sulfuric acid lignins (products obtained by hydrothermally treating a residual lignin (a sulfuric acid lignin), produced by saccharifying a starting material such as wood with sulfuric acid, in an aqueous alkali solution for water solubilization), alkali lignins (products obtained by treating a starting material such as paddy straw or wheat straw in an aqueous alkali solution for water solubilization), and enzyme saccharified residual lignins.

<Preparation of Phosphorylated Lignin Derivative>

For the two types of lignin derivatives provided above, i.e., kraft lignin and phenolated sulfuric acid lignin, each lignin derivative was dissolved in pyridine, phosphoryl chloride was added, and the mixture was stirred at room temperature for one hr. In this reaction, pyridine was used in such an amount that could dissolve the whole amount of the lignin derivative. Conditions for the synthesis are shown in detail in Table 1. After the reaction, the resultant precipitate was collected by filtration. The content of phosphorus in the reaction product was measured by a flask combustion method (a titration method). The results are also shown in Table 1. It could be confirmed that the content of phosphorus in the phosphorylated lignin derivatives was on the order of 7% or 8%.

<Measurement of Decomposition Start Temperature>

The decomposition start temperature of the phosphorylated Lignin derivative was measured with DSC2000A manufactured by Mac Science. Specifically, in the apparatus, the phosphorylated lignin derivative heated from room temperature to 300° C. at a temperature rise rate of 10° C./ min under an air atmosphere. The temperature at which an exothermic reaction which is a decomposition reaction started was defined as a decomposition start temperature, and the decomposition start temperature was determined from a DSC (differential scanning calorimetry) chart. The results are also shown in Table 1.

TABLE 1

| Conditions for phosphorylation and phosphorus content of lignin derivatives | | |
|---|---|---|
| Lignin derivative used | Kraft lignin | Phenolated sulfuric acid lignin |
| Mass of lignin derivative used (g) | 8.0 | 8.0 |
| Amount of POCl$_3$ used (ml) | 4.0 | 8.0 |
| Amount of pyridine used (ml) | 150 | 200 |
| Yield (g) | 10.7 | 11.9 |
| Phosphorus content (%) | 7.2 | 8.8 |
| Decomposition start temp. (° C.) | 230.2 | 225.9 |

<Preparation of Flame Retardant Resin Composition>

20 parts by mass of various phosphorylated lignin derivatives prepared above and 0.5 parts by mass of polyfluoroolefin were added to 80 parts by mass of poly lactic acid. They were dry-blended, and the blend was melt-kneaded at a temperature of 170° C. with a biaxial kneader/extruder to prepare molding pellets of about 3 mm square.

Lacea H100-J manufactured by Mitsui Chemicals Inc. was used as poly lactic acid. Metablen A-3800 manufactured by Mitsubishi Rayon Co., Ltd. was used as the polyfluoroolefin.

<Preparation of Specimen for UL94 Vertical Combustion Test>

The pellets thus prepared were dried with a shelf-type hot-air drier at 60° C. for 5 hr. Thereafter, a strip specimen for a UL94 vertical combustion test was prepared with a 100-ton (clamping force) electric injection molding machine under conditions of a mold temperature of 40° C., a cylinder temperature of 190° C., an injection speed of 20 mm/sec, an injection pressure of 100 MPa, and a cooling time of 30 sec. The strip specimen thus prepared had a size of 13 mm in width, 125 mm in length, and 1.6 mm in thickness.

Example 3

<Preparation of Flame Retardant Resin Composition>

15 parts by mass of the phosphorylated lignin derivative prepared in Example 2 by phosphorylating phenolated sulfuric acid lignin, 5 parts by mass of a flame retarding auxiliary, and 0.5 parts by mass of polyfluoroolefin were added to 80 parts by mass of a PC/ABS resin obtained by polymer-alloying a polycarbonate resin with an acrylonitrile-butadienestyrene copolymer resin. They were dry-blended, and the blend was melt-kneaded at a temperature of 170° C. with a biaxial kneader/extruder to prepare molding pellets of about 3 mm square.

MULTILON T-3714 manufactured by Teijin Ltd. was used as the PC/ABS resin. Metablen A-3800 (acryl-modified polytetrafluoroethylene, manufactured by Mitsubishi Rayon Co., Ltd.) was used as the polyfluoroolefin. ADEKA STAB FP-800 manufactured by ADEKA corporation was used as the flame retarding auxiliary.

<Preparation of Specimen for UL94 Vertical Combustion Test>

The pellets thus prepared were dried with a shelf-type hot-air drier at 80° C. for 5 hr. Thereafter, a strip specimen for a UL94 vertical combustion test was prepared with a 100-ton (clamping force) electric injection molding machine under conditions of a mold temperature of 60° C., a cylinder temperature of 2,400° C., an injection speed of 20 mm/sec, an injection pressure of 100 MPa, and a cooling time of 30 sec. The strip specimen thus prepared had a size of 13 mm in width, 125 mm in length, and 1.6 mm in thickness.

Example 4

<Preparation of Flame Retardant Resin Composition>

A 3HB-3HV copolyester is a copolymer of 3-hydroxybutyric acid (abbreviated as 3HB) and 3-hydroxyvaleric acid (abbreviated as 3HV). 20 parts by mass of the phosphorylated lignin derivative prepared in Example 2 by phosphorylating phenolated sulfuric acid lignin and 0.5 parts by mass of polyfluoroolefin were added to 80 parts by mass of the 3HB-3HV copolyester. They were dry-blended, and the blend was melt-kneaded at a temperature of 180° C. with a biaxial kneader/extruder to prepare molding pellets of about 3 mm square.

The 3HB-3HV copolyester was prepared by the following method.

Polyester-containing cultured cells were obtained by performing culture using bacteria belonging to the genus *Bacillus* in a medium containing peptone 5.0 g/liter, yeast extract 5.0 g/liter, and meat extract 5.0 g/liter for 16 hr and culturing the cultured solution at 45° C. for 48 hr in a minimal medium (containing glucose) with a limited nitrogen source to which propionic acid had been added. The cultured cells thus obtained were lyophilized, and chloroform was added to extract intracellular substances. The insolubles were separated by filtration, and methanol was added to the filtrate to reprecipitate the cell extract. The cells were collected again by filtration to obtain a purified cell product. The cell product was analyzed by NMR. As a result, it was found that the content ratio (molar ratio) between 3-hydroxybutyric acid monomer unit (3HB) and 3-hydroxyvaleric acid monomer unit (3HV) was about 92.3:7.7. The weight average molecular weight (Mw) was measured by GPC and was found to be 1,220,000 in terms of standard polystyrene.

Metablen A-3800 (acryl-modified polytetrafluoroethylene, manufactured by Mitsubishi Rayon Co., Ltd.) was used as the polyfluoroolefin.

<Preparation of Specimen for UL94 Vertical Combustion Test>

A specimen for a UL94 vertical combustion test was prepared under the same conditions as in Example 1, except that the pellets prepared just above were used.

Comparative Examples 1 and 2

<Preparation of Flame Retardant Resin Composition>

20 parts by mass of each of kraft lignin and phenolated sulfuric acid lignin used as a starting material in Examples 1 and 2 and 0.5 parts by mass of polyfluoroolefin were added to 80 parts by mass of poly lactic acid. They were dry-blended, and the blend was melt-kneaded at a temperature of 170° C. with a biaxial kneader/extruder to prepare molding pellets of about 3 mm square.

Lacea H100J manufactured by Mitsui Chemicals Inc. was used as poly lactic acid. Metablen A-3800 manufactured by Mitsubishi Rayon Co., Ltd. was used as polyfluoroolefin.

<Specimen for UL94 Vertical Combustion Test>

A specimen for a UL94 vertical combustion test was prepared under the same conditions as in Example 1, except that the pellets prepared just above were used.

Comparative Example 3

<Specimen for UL94 Vertical Combustion Test>

A specimen for a UL94 vertical combustion test was prepared under the same conditions as in Example 1, except that the PC/ABS resin (MULTILON T-3714 manufactured by Teijin Ltd.) used in Example 3 was used.

Comparative Example 4

<Specimen for UL94 Vertical Combustion Test>

A specimen for a UL94 vertical combustion test was prepared under the same conditions as in Example 1, except that the 3HB-3HV copolyester used in Example 4 was used.

For the specimens for a UL94 vertical combustion test prepared above, a UL94 vertical combustion test and thermogravimetry were carried out as follows. The results of evaluation are shown in Tables 2 and 3.

<UL94 Vertical Combustion Test>

The specimens thus prepared were aged at 50° C. for 72 hr and were then cooled in a desiccator of humidity 20% RH for 3 hr. Subsequently, specimens (one set consisting of five specimens) were subjected to a vertical combustion test according to UL94 standards.

A testing method will be described below.

An upper end of each specimen is clamped and is kept in a vertical state. An absorbent cotton (0.8 g or less, 50 mm square) is placed 300 mm±10 mm below the lower end of each specimen, followed by the following combustion test to examine whether or not a melt drops on the absorbent cotton. A flame from a burner is brought into contact with each specimen from its lower end for 10 sec±1 sec (first time). Thereafter, the burner is separated from the specimen at a speed of about 300 mm/sec. As soon as combustion is stopped, the burner is returned to the lower end of the sample and the contact of a flame with the lower end of the sample was carried out for 10 sec±1 sec (second time). For specimens (one set consisting of five specimens), the flame contact was carried out 10 times in total, and the combustion time was recorded for each specimen.

Here the term "combustion time" means a combustion duration time after the separation of the flame. The combustion time for the first time, the combustion time for the second time, and the fire source duration time after the second combustion were designated as t1, t2, and t3, respectively.

Here the expression "fire source duration time after the second combustion" means a time for which a red fire source stays in the specimen although the flame has become extinct.

<Method for Determination of Results of UL94 Vertical Combustion Test>

The results of the UL94 vertical combustion test were determined by the following methods.

(1) For each specimen, the results were evaluated as V-0 when the measured combustion duration times t1, t2 after the flame separation were 10 sec or less; and the results were evaluated as V-1 or V-2 when the measured combustion duration times t1, t2 after the flame separation were 30 sec or less. For the boundary for the distinction between V1 and V2, the ignition of the cotton with a dropped melt during the combustion according to the following item (5) was used as a reference. Specifically, the results were evaluated as V-2 when ignition of the cotton occurred; and the results were evaluated as V-1 when ignition of the cotton did not occur.

(2) The results were evaluated as V-0 when the combustion duration times (t1+t2) for all the five specimens were 50 sec or less; and the results were evaluated as V-1 or V-2 when the combustion duration times (t1+t2) for all the five specimens were 250 sec or less.

(3) The results were evaluated as V-0 when the total of the combustion duration time and the fire source duration time after the second flame contact, i.e., t2+t3, was 30 sec or less; and the results were evaluated as V-1 or V-2 when t2+t3 was 60 sec or less.

(4) The results were evaluated as acceptable when burning combustion to the clamp did not occur.

(5) Ignition of the adsorbent cotton with a combustion product or a dropped object was evaluated. The results were evaluated as V-0 or V-1 c when ignition did not occur; and the results were evaluated as V-2 when ignition occurred.

Here for the boundary for distinction between V-0 and V-1 when ignition did not occur, the results of measurement of combustion duration times (t1+t2) and (t2+t3) in the above items (2) and (3) are used as a reference. The results were evaluated as V-0 when t1+t2 was 50 sec or less; and the results were evaluated as V-1 when t1+t2 was larger than 50 sec and not larger than 250 sec.

The results were evaluated as V-0 when t2+t3 was 30 sec or less; and the results were evaluated as V-1 when t2+t3 was larger than 30 sec and 60 sec or less. For each of the items (1) to (5), the results were evaluated as an acceptable level from a practical viewpoint when all the V-0, V-1, and V-2 requirements were simultaneously satisfied.

<Thermogravimetric Measurement>

In a thermogravimetric analysis, the residual mass was measured with TG-DTA2000A manufactured by Mac Science when the sample was heated from room temperature to 500° C. at a temperature rise rate of 5° C./min under an air atmosphere. The mass at a temperature of 100° C. was used as a reference, and the sample was evaluated based on the proportion (%) of the residual mass relative to the reference.

<Results>

For the resin compositions used in Examples 1 to 4 and Comparative Examples 1 to 4, the blending ratio and the results of the UL94 vertical combustion test and the thermogravimetric measurement are shown in Tables 2 and 3.

The results of the combustion test were indicated by NG when the sample did not satisfy the V-2 requirement.

Here the blending ratio and the test results for the flame retardant resin compositions used in the Examples and the Comparative Examples are shown in Tables 2 and 3.

TABLE 2

Blending ratio and test results for flame retardant resin compositions (Examples)

| | | Ex. 1 | Ex. 2 | Ex. 3 | Ex. 4 |
|---|---|---|---|---|---|
| Blending ratio | A-1 | 80 | 80 | | |
| | A-2 | | | 80 | |
| | A-3 | | | | 80 |
| | B-1 | 20 | | | |
| | B-2 | | 20 | 15 | 20 |
| | C-1 | | | 5 | |
| | D-1 | 0.5 | 0.5 | 0.5 | 0.5 |
| Test results | Flame retardancy | V-2 | V-2 | V-1 | V-2 |
| | Residue (%) | 7.5 | 4.0 | 11.4 | 6.1 |

TABLE 3

Blending ratio and test results for flame retardant resin compositions (Comparative Examples)

| | | Comp. Ex. 1 | Comp. Ex. 2 | Comp. Ex. 3 | Comp. Ex. 4 |
|---|---|---|---|---|---|
| Blending ratio | A-1 | 80 | 80 | | |
| | A-2 | | | 100 | |
| | A-3 | | | | 100 |
| | B-3 | 20 | | | |
| | B-4 | | 20 | | |
| | C-1 | | | | |
| | D-1 | 0.5 | 0.5 | | |
| Test results | Flame retardancy | NG | NG | NG | NG |
| | Residue (%) | 0.0 | 0.0 | 0.2 | 0.0 |

Details of ingredients used in the Examples and the Comparative Examples in Tables 2 and 3 above are as follows.

A-1: poly lactic acid; Lacea H-100J manufactured by Mitsui Chemicals Inc.
A-2: PC/ABS resin; MULTILON T-3714 manufactured by Teijin Ltd.
A-3: 3HB-3HV copolyester
B-1: phosphorylation product of kraft lignin
B-2: phosphorylation product of phenolated sulfuric acid lignin
B-3: kraft lignin
B-4: phenolated sulfuric acid lignin
C-1: phosphorus flame retardant; ADEKA STAB FP-800 manufactured by ADEKA
D-1: polyfluoroolefin; Metablen A-3800 manufactured by Mitsubishi Rayon Co., Ltd.

For Examples 1 to 2, the 500° C. residual mass in the thermogravimetric analysis was 4% or more, and the results of the flame retardancy test satisfied the V-2 requirement.

For Example 3, the 500° C. residual mass in the thermogravimetric analysis was 10% or more, and the results of the flame retardancy test satisfied the V-1 requirement. For Example 4, the 500° C. residual mass in the thermogravimetric analysis was 6% or more, and the results of the flame retardancy test satisfied the V-2 requirement.

In particular, for the material as in Example 3 in which the kneading temperature is high, the decomposition start temperature of the phosphorylated lignin derivative is an issue. The phosphorylation product of kraft lignin in Example 1 has a somewhat higher thermal decomposition temperature, i.e., a thermal decomposition temperature of 230.2° C. and thus is also applicable to materials that are kneaded at a high temperature.

On the other hand, when the lignin material was added to the thermoplastic resin as in Comparative Examples 1 and 2, there was no 500° C. residue in the thermogravimetric analysis, and, in the flame retardancy test, the sample was completely burned out, indicating that the flame retardancy was NG.

For Comparative Example 3, the amount of the 500° C. residue in the thermogravimetric analysis in the thermoplastic resin per se was slight, and the result of the flame retardancy test was NG.

For the thermoplastic resin per se in Comparative Example 4, there was no 500° C. residue in the thermogravimetric analysis. In the combustion test, the sample was completely burned out, and, thus, the results were NG. Further, for all the Comparative Examples, the flame retardancy was NG.

Examples 5 to 8 and Comparative Examples 5 to 8 will be described.

Examples 5 and 6

<Preparation of Lignin Derivative>

Two types of lignin derivatives, i.e., kraft lignin and phenolated sulfuric acid lignin, were used as the lignin derivative.

The kraft lignin in Example 5 is contained in a cooking liquor (a black liquor) discharged in the production of pulp by a kraft process in which an aqueous sodium hydroxide and an aqueous sodium sulfide solution are brought into a cooking liquor). In Example 5, Lignin, alkali (370959), a reagent manufactured by Aldrich, was used.

Phenolated sulfuric acid lignin in Example 6 was one obtained by saccharifying wood as a starting material with sulfuric acid to give a residual lignin (sulfuric acid lignin) and reacting the residual lignin with phenol to enhance reaction activity.

Lignin derivatives other than mentioned above usable herein include hydrothermally treated sulfuric acid lignins (products obtained by hydrothermally treating a residual lignin (a sulfuric acid lignin), produced by saccharifying a starting material such as wood with sulfuric to acid, in an aqueous alkali solution for water solubilization), alkali lignins (products obtained by treating a starting material such as paddy straw or wheat straw in an aqueous alkali solution for water solubilization), and enzyme saccharified residual lignins.

<Preparation of Phosphorylated Lignin Derivative>

For each of the lignin derivatives, 8 g of the lignin derivative was dissolved in 500 ml of a 1N aqueous sodium hydroxide solution, and the mixture was stirred at 60° C. After the elapse of 2 hr and 4 hr from the start of the stirring, 100 ml of a 37% aqueous formaldehyde solution was added, and a reaction was allowed to proceed for 6 hr. After the completion of the reaction, the reaction solution was acidified by the addition of a 1N aqueous hydrochloric acid solution. The resultant precipitate was collected by filtration to obtain a hydroxymethylated lignin derivative.

Subsequently, each hydroxymethylated lignin derivative was dissolved in pyridine, phosphoryl chloride was added, and the mixture was stirred at room temperature for one hr. In this reaction, pyridine was used in such an amount that could dissolve the whole amount of the lignin derivative.

Conditions for the synthesis are shown in detail in Table 4. After the reaction, the resultant precipitate was collected by filtration. The content of phosphorus in the reaction product was measured by a flask combustion method (a titration method). The results are also shown in Table 4. It could be confirmed that the content of phosphorus in the is phosphorylated lignin derivatives was on the order of 7% or 8%.

<Measurement of Decomposition Start Temperature>

The decomposition start temperature of the phosphorylated lignin derivative was measured with DSC2000A manufactured by Mac Science. Specifically, in the apparatus, the phosphorylated lignin derivative heated from room temperature to 300° C. at a temperature rise rate of 10° C./min under an air atmosphere. The temperature at which an exothermic reaction which is a decomposition reaction started was defined as a decomposition start temperature, and the decomposition start temperature was determined from a DSC (differential scanning calorimetry) chart. The results are also shown in Table 4.

TABLE 4

| Conditions for phosphorylation and phosphorus content of lignin derivatives | | |
|---|---|---|
| Lignin derivative used | Hydroxymethylated kraft lignin | Hydroxymethylated phenolated sulfuric acid lignin |
| Mass of lignin used (g) | 8.0 | 8.0 |
| Amount of $POCl_3$ used (ml) | 8.0 | 8.0 |
| Amount of pyridine used (ml) | 150 | 200 |
| Yield (g) | 12.5 | 12.4 |
| Phosphorus content (%) | 7.2 | 8.3 |
| Decomposition start temp. (° C.) | 238.6 | 267.1 |

<Preparation of Flame Retardant Resin Composition>

20 parts by mass of various phosphorylated lignin derivatives prepared above and 0.5 parts by mass of polyfluoroolefin were added to 80 parts by mass of poly lactic acid. They were dry-blended, and the blend was melt-kneaded at a temperature of 170° C. with a biaxial kneader/extruder to prepare molding pellets of about 3 mm square.

Lacea H100-J manufactured by Mitsui Chemicals Inc. was used as poly lactic acid. Metablen A-3800 manufactured by Mitsubishi Rayon Co., Ltd. was used as the polyfluoroolefin.

<Preparation of Specimen for UL94 Vertical Combustion Test>

The pellets thus prepared were dried with a shelf-type hot-air drier at 60° C. for 5 hr. Thereafter, a strip specimen for a UL94 vertical combustion test was prepared with a 100-ton (clamping force) electric injection molding machine under conditions of a mold temperature of 40° C., a cylinder temperature of 190° C., an injection speed of 20 mm/sec, an injection pressure of 100 MPa, and a cooling time of 30 sec. The strip specimen thus prepared had a size of 13 mm in width, 125 mm in length, and 1.6 mm in thickness.

Example 7

<Preparation of Flame Retardant Resin Composition>

15 parts by mass of the phosphorylated lignin derivative prepared in Example 6 by phosphorylating hydroxymethylated phenolated sulfuric acid lignin, 5 parts by mass of a flame retarding auxiliary, and 0.5 parts by mass of polyfluoroolefin were added to 80 parts by mass of a PC/ABS resin obtained by polymer-alloying a polycarbonate resin with an acrylonitrile-butadiene-styrene copolymer resin. They were dry-blended, and the blend was melt-kneaded at a temperature of 170° C. with a biaxial kneader/extruder to prepare molding pellets of about 3 mm square.

MULTILON T-3714 manufactured by Teijin Ltd. was used as the PC/ABS resin. Metablen A-3800 (acryl-modified poly-tetrafluoroethylene, manufactured by Mitsubishi Rayon Co., Ltd.) was used as the polyfluoroolefin. ADEKA STAB FP-800 manufactured by ADEKA corporation was used as the flame retarding auxiliary.

<Preparation of Specimen for UL94 Vertical Combustion Test>

The pellets thus prepared were dried with a shelf-type hot-air drier at 80° C. for 5 hr. Thereafter, a strip specimen for a UL94 vertical combustion test was prepared with a 100-ton (clamping force) electric injection molding machine under conditions of a mold temperature of 60° C., a cylinder temperature of 2,400° C., an injection speed of 20 mm/sec, an injection pressure of 100 MPa, and a cooling time of 30 sec. The strip specimen thus prepared had a size of 13 mm in width, 125 mm in length, and 1.6 mm in thickness.

Example 8

<Preparation of Flame Retardant Resin Composition>

A 3HB-3HV copolyester is a copolymer of 3-hydroxybutyric acid (abbreviated as 3HB) and 3-hydroxyvaleric acid (abbreviated as 3HV). 20 parts by mass of the phosphorylated lignin derivative prepared in Example 6 by phosphorylating hydroxymethylated phenolated sulfuric acid lignin and 0.5 parts by mass of polyfluoroolefin were added to 80 parts by mass of the 3HB-3HV copolyester. They were dry-blended, and the blend was melt-kneaded at a temperature of 180° C. with a biaxial kneader/extruder to prepare molding pellets of about 3 mm square.

The 3HB-3HV copolyester was prepared by the following method.

Polyester-containing cultured cells were obtained by performing culture using bacteria belonging to the genus *Bacillus* in a medium containing peptone 5.0 g/liter, yeast extract 5.0 g/liter, and meat extract 5.0 g/liter for 16 hr and culturing the cultured solution at 45° C. for 48 hr in a minimal medium (containing glucose) with a limited nitrogen source to which propionic acid had been added. The cultured cells thus obtained were lyophilized, and chloroform was added to extract intracellular substances. The insolubles were separated by filtration, and methanol was added to the filtrate to reprecipitate the cell extract. The cells were collected again by filtration to obtain a purified cell product. The cell product was analyzed by NMR. As a result, it was found that the content ratio (molar ratio) between 3-hydroxybutyric acid monomer unit (3HB) and 3-hydroxyvaleric acid monomer unit (3HV) was about 92.3:7.7. The weight average molecular weight (Mw) was measured by GPC and was found to be 1,220,000 in terms of standard polystyrene.

Metablen A-3800 (acryl-modified polytetrafluoroethylene, manufactured by Mitsubishi Rayon Co., Ltd.) was used as the polyfluoroolefin.

<Preparation of Specimen for UL94 Vertical Combustion Test>

A specimen for a UL94 vertical combustion test was prepared under the same conditions as in Example 5, except that the pellets prepared just above were used.

Comparative Examples 5 and 6

<Preparation of Flame Retardant Resin Composition>

20 parts by mass of each of hydroxymethylated kraft lignin and phenolated sulfuric acid lignin used as a starting material in Examples 5 and 6 and 0.5 parts by mass of polyfluoroolefin were added to 80 parts by mass of poly lactic acid. They were dry-blended, and the blend was melt-kneaded at a temperature of 170° C. with a biaxial kneader/extruder to prepare molding pellets of about 3 mm square.

Lacea H100J manufactured by Mitsui Chemicals Inc. was used as poly lactic acid. Metablen A-3800 manufactured by Mitsubishi Rayon Co., Ltd. was used as polyfluoroolefin.

<Preparation of Specimen for UL94 Vertical Combustion Test>

A specimen for a UL94 vertical combustion test was prepared under the same conditions as in Example 5, except that the pellets prepared just above were used.

Comparative Example 7

<Preparation of Specimen for UL94 Vertical Combustion Test>

A specimen for a UL94 vertical combustion test was prepared under the same conditions as in Example 5, except that the PC/ABS resin (MULTILON T-3714 manufactured by Teijin Ltd.) used in Example 7 was used.

Comparative Example 8

<Preparation of Specimen for UL94 Vertical Combustion Test>

A specimen for a UL94 vertical combustion test was prepared under the same conditions as in Example 5, except that the 3HB-3HV copolyester used in Example 8 was used.

For the specimens for a UL94 vertical combustion test prepared above, a UL94 vertical combustion test and a thermogravimetric measurement were carried out in the same manner as in Examples 5 to 8 and Comparative Examples 5 to 8. The results of evaluation are shown in Tables 5 and 6.

<Results>

For the resin compositions used in Examples 5 to 8 and Comparative Examples 5 to 8, the blending ratio and the results of the UL94 vertical combustion test and the thermogravimetric measurement are shown in Tables 5 and 6.

The results of the combustion test were indicated by NG when the sample did not satisfy the V-2 requirement.

Here the blending ratio and the test results for the flame retardant resin compositions used in the Examples and the Comparative Examples are shown in Tables 5 and 6.

TABLE 5

Blending ratio and test results for flame retardant resin compositions (Examples)

|  |  | Ex. 5 | Ex. 6 | Ex. 7 | Ex. 8 |
|---|---|---|---|---|---|
| Blending ratio | A-1 | 80 | 80 |  |  |
|  | A-2 |  |  | 80 |  |
|  | A-3 |  |  |  | 80 |
|  | B-1 | 20 |  |  |  |
|  | B-2 |  | 20 | 15 | 20 |
|  | C-1 |  |  | 5 |  |
|  | D-1 | 0.5 | 0.5 | 0.5 | 0.5 |
| Test results | Flame retardancy | V-2 | V-2 | V-1 | V-2 |
|  | Residue (%) | 5.5 | 5.3 | 10.3 | 6.9 |

TABLE 6

Blending ratio and test results for flame retardant resin compositions (Comparative Examples)

|  |  | Comp. Ex. 5 | Comp. Ex. 6 | Comp. Ex. 7 | Comp. Ex. 8 |
|---|---|---|---|---|---|
| Blending ratio | A-1 | 80 | 80 |  |  |
|  | A-2 |  |  | 100 |  |
|  | A-3 |  |  |  | 100 |
|  | B-3 | 20 |  |  |  |
|  | B-4 |  | 20 |  |  |

TABLE 6-continued

Blending ratio and test results for flame retardant resin compositions (Comparative Examples)

|  |  | Comp. Ex. 5 | Comp. Ex. 6 | Comp. Ex. 7 | Comp. Ex. 8 |
|---|---|---|---|---|---|
|  | C-1 |  |  |  |  |
|  | D-1 | 0.5 | 0.5 |  |  |
| Test results | Flame retardancy | NG | NG | NG | NG |
|  | Residue (%) | 0.0 | 0.0 | 0.2 | 0.0 |

Details of ingredients used in the Examples and the Comparative Examples in Tables 5 and 6 above are as follows.

A-1: poly lactic acid; Lacea H-100J manufactured by Mitsui Chemicals Inc.

A-2: PC/ABS resin; MULTILON T-3714 manufactured by Teijin Ltd.

A-3: 3HB-3HV copolyester

B-1: phosphorylation product of hydroxymethylated kraft lignin

B-2: phosphorylation product of hydroxymethylated phenolated sulfuric acid lignin B-3: hydroxymethylated kraft lignin B-4: hydroxymethylated phenolated sulfuric acid lignin C-1: phosphorus flame retardant; ADEKA STAB FP-800 manufactured by ADEKA D-1: polyfluoroolefin; Metablen A-3800 manufactured by Mitsubishi Rayon Co., Ltd.

For Examples 5 and 6, the 500° C. residual mass in the thermogravimetric analysis was 5% or more, and the results of the flame retardancy test satisfied the V-2 requirement.

For Example 7, the 500° C. residual mass in the thermogravimetric analysis was 10% or more, and the results of the flame retardancy test satisfied the V-1 requirement. For Example 8, the 500° C. residual mass in the thermogravimetric analysis was 6% or more, and the results of the flame retardancy test satisfied the V-2 requirement.

In particular, for the material as in Example 7 in which the kneading temperature is high, the decomposition start temperature of the phosphorylated lignin derivative is an issue. The phosphorylation product of hydroxymethylated phenolated sulfuric acid lignin in Example 6 has the highest thermal decomposition temperature, i.e., a thermal decomposition temperature of 267.1° C. and thus is a flame retardant material that suggests extended application to highly heat resistant materials that require high kneading temperatures.

On the other hand, when the lignin material was added to the thermoplastic resin as in Comparative Examples 5 and 6, there was no 500° C. residue in the thermogravimetric analysis, and, in the flame retardancy test, the sample was completely burned out, indicating that the flame retardancy was NG.

For Comparative Example 7, the amount of the 500° C. residue in the thermogravimetric analysis in the thermoplastic resin per se was slight, and the results of the flame retardancy test were NG.

For the thermoplastic resin per se in Comparative Example 8, there was no 500° C. residue in the thermogravimetric analysis. In the combustion test, the sample was completely burned out, and, thus, the results were NG. Further, for all the Comparative Examples, the flame retardancy was NG.

Embodiments of the present invention are as follows

<1> A flame retardant resin composition including:
a thermoplastic resin; and
a flame retardant,
wherein the flame retardant includes a phosphorylated lignin derivative, and
wherein the phosphorylated lignin derivative is produced by adding phosphoric acid to a lignin derivative obtained by subjecting a naturally occurring lignin to a predetermined treatment.

According to the flame retardant resin composition as described in <1>, a low-environment load-type flame retardant resin material can be obtained that has flame retardancy and a high degree of biomass. Further, a high level of dispersibility in resin can be obtained through the action of a hydrophilic group possessed by lignin derivatives. Furthermore, the lignin derivative has binding properties due to the nature of a polymeric substance, can realize a stable dispersion state in resin and, thus, can suppress bleedout in use.

<2> The flame retardant resin composition according to <1>, wherein the lignin derivative is hydroxymethylated before the phosphoric acid is added thereto.

According to the flame retardant resin composition as described in <2>, a low-environment load-type flame retardant resin material can he obtained that has flame retardancy and a high degree of biomass. Further, a high level of dispersibility in resin can be obtained through the action of a hydrophilic group possessed by lignin derivatives. Furthermore, the lignin derivative has binding properties due to the nature of a polymeric substance, can realize a stable dispersion state in resin and, thus, can suppress bleedout in use.

<3> The flame retardant resin composition according to any one of <1> and <2>, wherein the lignin derivative is a kraft lignin.

According to the flame retardant resin composition as described in <3>, flame retardancy can be obtained even by using inexpensive starting materials. Further, a kraft lignin (a black liquor) used in cascade as a fuel can be used as a highly functional material, contributing to a lowered environment load.

<4> The flame retardant resin composition according to any one of <1> and <2>, wherein the lignin derivative is a phenolated sulfuric acid lignin.

According to the flame retardant resin composition as described in <4>, a saccharified residual lignin which has not been utilized as a resource can be used, making it possible to obtain flame retarding properties using inexpensive starting materials.

<5> The flame retardant resin composition according to any one of <1> and <2>, wherein the lignin derivative is a hydrothermally treated sulfuric acid lignin.

According to the flame retardant resin composition as described in <5>, a saccharified residual lignin which has not been utilized as a resource can be used, making it possible to obtain flame retarding properties using inexpensive starting materials.

<6> The flame retardant resin composition according to any one of <1> and <2>, wherein the lignin derivative is an alkali lignin.

According to the flame retardant resin composition as described in <6>, a saccharified residual lignin which has not been utilized as a resource can be used, making it possible to obtain flame retarding properties using inexpensive starting materials.

<7> The flame retardant resin composition according to any one of <1> to <6>, wherein the thermoplastic resin includes at least one selected from aromatic polyesters, aliphatic polyesters, and carbonate bond-containing polymers.

According to the flame retardant resin composition as described in <7>, the flame retardancy can be further enhanced.

<8> The flame retardant resin composition according to any one of <1> to <7>, wherein the thermoplastic resin is a thermoplastic resin produced using a biomass as at least a part of a starting material.

According to the flame retardant resin composition as described in <8>, a low-environment load-type flame retardant resin material can be obtained that further possesses flame retardancy and a high degree of biomass.

<9> The flame retardant resin composition according to any one of <1> to <8>, wherein the flame retardant resin composition further includes at least one flame retarding auxiliary selected from the group consisting of phosphorus flame retardants, nitrogen compound flame retardants, silicone flame retardants, bromine flame retardants, inorganic flame retardants, and polyfluoroolefins.

According to the flame retardant resin composition as described in <9>, the flame retardancy can be further enhanced.

<10> A molded product produced by molding the flame retardant resin composition according to any one of <1> to <9>.

According to the molded product as described in <10>, molded products having high flame retardancy can be obtained and can be used as molded products for electric/electronic equipment.

Industrial Applicability

The flame retardant resin composition according to the present invention is excellent in flame retardancy as well and thus can be extensively used as components usable in image output equipment using electrophotographic techniques, printing techniques, or ink jet techniques for copying machines and laser printers, electric/electronic equipment for home electric appliances, and interior components for automobiles.

The invention claimed is:

1. A flame retardant resin composition comprising:
   a thermoplastic resin; and
   a flame retardant,
   wherein the flame retardant comprises a phosphorylated lignin derivative, and
   wherein the phosphorylated lignin derivative is produced by 1) hydroxymethylating a lignin derivative obtained by subjecting a naturally occurring lignin to a predetermined treatment, and then 2) adding phosphoric acid to the hydroxymethylated lignin derivative.

2. The flame retardant resin composition according to claim 1, wherein the lignin derivative obtained by subjecting the naturally occurring lignin to the predetermined treatment is at least one selected from the group consisting of kraft lignins, phenolated sulfuric acid lignins, hydrothermally treated sulfuric acid lignins and alkali lignins.

3. The flame retardant resin composition according to claim 2, wherein the lignin derivative obtained by subjecting the naturally occurring lignin to the predetermined treatment is the kraft lignin or the phenolated sulfuric acid lignin.

4. The flame retardant resin composition according to claim 1, wherein the thermoplastic resin comprises at least one selected from the group consisting of aromatic polyesters, aliphatic polyesters, and carbonate bond-containing polymers.

5. The flame retardant resin composition according to claim 1, wherein the thermoplastic resin is a thermoplastic resin produced using a biomass as at least a part of a starting material.

6. The flame retardant resin composition according to claim 1, wherein the flame retardant resin composition further comprises at least one flame retarding auxiliary selected from phosphorus flame retardants, nitrogen compound flame retardants, silicone flame retardants, bromine flame retardants, inorganic flame retardants, and polyfluoroolefins.

7. A molded product produced by molding a flame retardant resin composition, wherein the flame retardant resin composition comprises:
   a thermoplastic resin; and
   a flame retardant,
   wherein the flame retardant comprises a phosphorylated lignin derivative, and
   wherein the phosphorylated lignin derivative is produced by 1) hydroxymethylating a lignin derivative obtained by subjecting a naturally occurring lignin to a predetermined treatment, and then 2) adding phosphoric acid to the hydroxymethylated lignin derivative.

* * * * *